US006556375B2

(12) United States Patent
Obara

(10) Patent No.: US 6,556,375 B2
(45) Date of Patent: Apr. 29, 2003

(54) HARD DISK DRIVE DEVICE

(75) Inventor: Rikuro Obara, Miyota-machi (JP)

(73) Assignee: Minebea Kabushiki-Kaisha, Nagano-ken (JP)

( * ) Notice: Subject to any disclaimer, the term of this patent is extended or adjusted under 35 U.S.C. 154(b) by 0 days.

(21) Appl. No.: 10/252,168

(22) Filed: Sep. 23, 2002

(65) Prior Publication Data

US 2003/0043502 A1 Mar. 6, 2003

Related U.S. Application Data

(63) Continuation of application No. 09/252,670, filed on Feb. 19, 1999, now abandoned.

(30) Foreign Application Priority Data

Feb. 19, 1998 (JP) ............................................. 10-054306

(51) Int. Cl.$^7$ ........................ G11B 17/022; G11B 5/82
(52) U.S. Cl. ............................... 360/99.08; 360/99.12; 360/135
(58) Field of Search ............................ 310/90, 67 R; 360/99.08, 99.12, 135

(56) References Cited

U.S. PATENT DOCUMENTS

| | | | | |
|---|---|---|---|---|
| 3,973,920 A | * | 8/1976 | Tadokoro et al. .............. 428/62 |
| 4,380,558 A | * | 4/1983 | Yanagisawa ................. 427/554 |
| 4,714,972 A | * | 12/1987 | Biermeier et al. ........ 360/97.03 |
| 4,739,425 A | * | 4/1988 | Dierkes et al. .......... 360/98.08 |
| 4,899,237 A | * | 2/1990 | Tochiyama et al. ...... 360/98.02 |
| 5,023,733 A | * | 6/1991 | Koga et al. .............. 360/77.04 |
| 5,157,295 A | * | 10/1992 | Stefansky et al. ............. 310/90 |
| 5,272,581 A | * | 12/1993 | Kojima et al. ........... 360/98.01 |
| 5,323,076 A | * | 6/1994 | Hajec ........................... 310/90 |
| 5,333,079 A | * | 7/1994 | Takegami et al. ......... 360/99.08 |
| 5,598,047 A | * | 1/1997 | Sakuragi et al. ........... 310/67 R |
| 5,668,427 A | * | 9/1997 | Morita ........................ 310/216 |
| 5,701,219 A | * | 12/1997 | Shafe' ...................... 360/254.8 |
| 5,801,900 A | * | 9/1998 | Elsaesser et al. ......... 360/98.07 |
| 5,877,916 A | * | 3/1999 | Papst ...................... 360/98.07 |
| 5,885,005 A | * | 3/1999 | Nakano et al. .............. 384/113 |
| 5,949,165 A | * | 9/1999 | Sakuragi ................... 310/67 R |

* cited by examiner

Primary Examiner—William J Klimowicz
(74) Attorney, Agent, or Firm—Israel Gopstein

(57) ABSTRACT

The object of the present invention is to provide a hard disk drive device having a bearing device of larger size and sufficient strength, improved impact resistance, high accuracy of rotation, and high reliability. In accordance with the present invention, a hard disk drive device comprises a motor including: a rotor or hub having around an outer periphery thereof a downwardly depending flange, wherein the hub is journalled rotatably on a base by way of a bearing; the hub provided with a magnet on the inner peripheral surface of the downwardly depending flange; a stator provided on the base so as to be opposed face to face with the magnet, the stator including coils; and a magnetic disk or disks having a central aperture to be fitted around the outer peripheral surface of flange provided around the hub of the motor, the magnetic disk adapted to be rotated by the motor; wherein the inner diameter of the downwardly depending flange of the hub of the motor is enlarged, so that the outer and inner diameters of the magnet confined within the downwardly depending flange, and the outer and inner diameters of the stator are also enlarged to allow the outer diameter of the bearing device to be enlarged.

36 Claims, 2 Drawing Sheets

HARD DISK DRIVE DEVICE

This application is a continuation of U.S. application Ser. No. 09/252,670, filed Feb. 19, 1999, now abandoned.

BACKGROUND OF THE INVENTION

1. Technical Field

The present invention relates to an improvement of a hard disk device employed, for example, for sorting data magnetically in computers.

2. Description of the Prior Art

A hard disk drive device includes a magnetic disk or disks for storing magnetic data. Such disks are mounted on a hub, i.e., the rotational member of a motor. In order to write the desired magnetic data into a sector on the magnetic disk or to read the data therefrom, the disk or disks are rotated at high speed by moans of the motor.

In recent years, it is desired to provide a smaller, thinner, and lighter weight, as well as impact resistant magnetic storage means, especially a hard disk drive device.

When impact is applied to the hard disk means, the impact energy is apt to be concentrated in the bearing means journalling the rotor or hub of the motor for driving the magnetic disk, so that the bearing means is the element that is most liable to be damaged.

When the bearing means is damaged, the accuracy of rotation of the magnetic disk will diminish, the reading and writing of the magnetic data can not be accomplished accurately, and noise and vibration are produced.

One of the countermeasures which can be taken for preventing the damage to the bearing means is to strengthen the bearing means itself. This countermeasure is confronted with the problem that the magnetic disk is fabricated under a predetermined standard to have an outer diameter of 2.5 inches or 3.5 inches, and the central aperture thereof is also restricted by such a standard to have an inner diameter of 20.0 mm or 25.0 mm respectively. In other words, the outer diameter of the hub as well as that of the magnet and/or the stator are also adapted to be defined under the standard in accordance with the diameter of the central aperture of the magnetic disk, so that a bearing means of sufficient size and strength can not be used.

It is not necessary to make the diameter of the central aperture of the magnetic disk as mentioned above. However, a magnetic disk having a central aperture of a diameter larger than that defined under the predetermined standard and a hard disk drive means including a motor larger in the outer diameter of its hub for driving such disk have not been realized. This is because the enlargement of the diameter of the central aperture of the magnetic disk leads to a reduction of the surface area of the magnetic disk and of the capacity of the memory for storing magnetic data.

Although the countermeasure that reducing the radial thickness of said magnet and/or the radial length of the stator to provide a space required for enlarging the bearing means can be taken, this will have an adverse impact on the function of the motor such as the rotational torque or the rotational speed. In this connection, this countermeasure can not be adopted.

Accordingly, the object of the present invention is to provide a hard disk drive device having a bearing means of larger size and sufficient strength, improved impact resistance, high accuracy of rotation, and high reliability.

SUMMARY OF THE INVENTION

These and other objects are achieved by a hard disk drive device comprising a motor including a rotor or hub and a stator, and a magnetic disk. The hub has a flange depending downwardly from the outer periphery thereof. The hub is journalled rotatablly on a base by means of a bearing means. The hub is provided with a magnet on the inner peripheral surface of the downwardly depending flange. The stator is provided on the base so as to opposed face to face with said magnet. The stator includes coils The magnetic disk or disks having a central apparatus to be fitted around the outer peripheral surface of the flange provided around the hub of the motor. The magnetic disk is adapted to be rotated by means of said motor. The inner diameter of the downwardly depending flange of said hub of the motor is enlarged, so that the outer and inner diameters of the magnet confined within the downwardly depending flange, and the outer and inner diameters of the stator are also enlarged to allow the outer diameter of the bearing means to be enlarged.

BRIEF DESCRIPTION OF THE DRAWINGS

Further feature of the present invention will become apparent to those skilled in the art to which the present invention relates from reading the following specification with reference to the accompanying drawings, in which.

DETAILED DESCRIPTION OF THE PRESENT INVENTION

Figure 1:
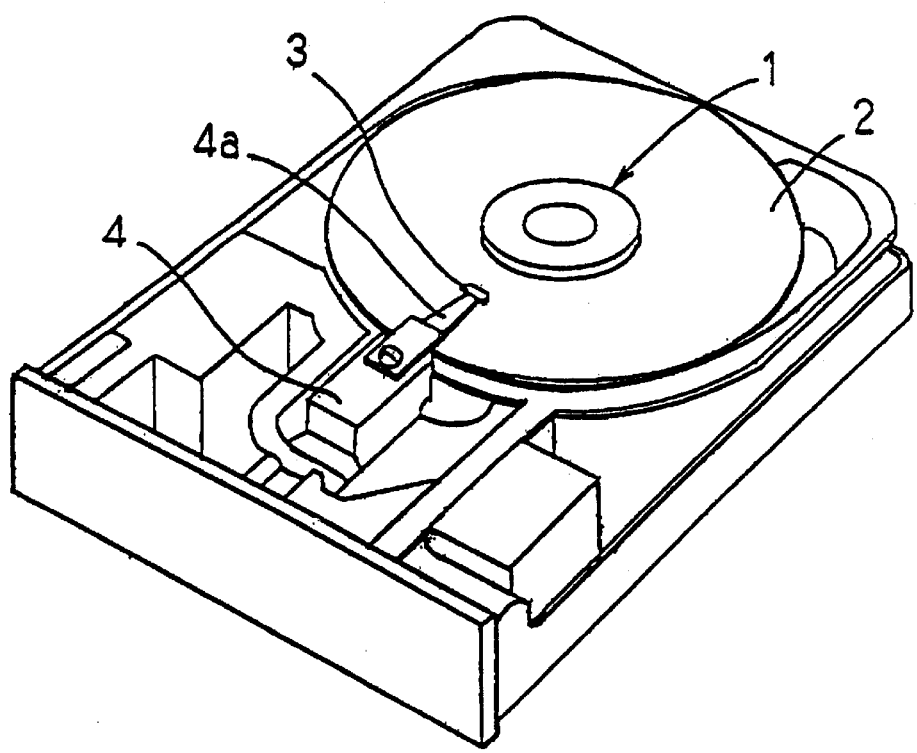
FIG. 1 is a perspective view of the hard disk drive device of the present invention.

A preferred embodiment of a hard disk drive device in accordance with the present invention will now be described in detail with reference to the attached drawings.

In the attached drawing, reference numeral 1 is added to a motor for driving a magnetic disk or disks 2, and reference numeral 3 is added to a magnetic head for writing magnetic data onto the magnetic disk 2 and reading data therefrom. The magnetic head 3 is mounted on the distal end of a head 4a of a head positioning mechanism 4 so as to be moved to a predetermined radial position of the magnetic disk 2 and to be stopped thereon by means of the head positioning mechanism 4.

Figure 2:
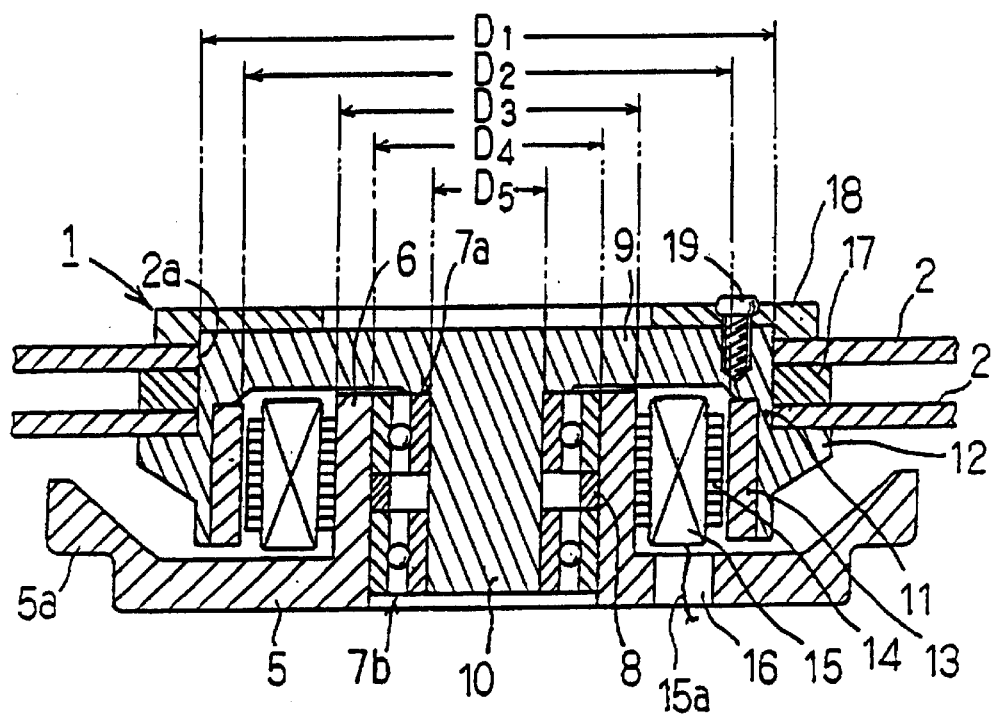
FIG. 2 is an enlarged longitudinal cross-sectional view of the motor of the hard disk drive device of FIG. 1.

The motor 1 has a structure as shown for example in FIG. 2. In this structure, a base 5 includes an annular flange 5a extending around the outer periphery of the base and a cylindrical sleeve 6 having a bore therethrough. The flange 5a and the sleeve 6 are formed integrally with the base by using the identical material. Upper and lower ball bearings 7a, 7b spaced from each other by means of a spacer 8 are mounted within the bore of the sleeve 6. Each of these bearings includes inner and outer races and rotating bodies e. g. a plurality of balls interposed between the races. A shaft 10 protruding downwardly from the central portion or the bottom surface of the hub 9 is adapted to :be journalled by these ball bearings. Again, the shaft is formed integrally with the hub 9 by using the identical material.

The hub 9 has at its outer periphery a flange 11 depending downwardly therefrom. An annular shoulder 12 is formed on the outer peripheral surface of the flange 11.

A magnet 13 is secured on the inner peripheral surface of the flange 11 so as to be opposed with the outer peripheral surface of the stator 14 mounted on the outer peripheral surface of the sleeve 6 of said base. There is slight clearance between the inner peripheral surface of the magnet and the outer peripheral surface of the stator. The stator includes coils 15 for conducing current. The wires 15a lead to the coils and those from the coils are adapted to be guided through the aperture 16 provided through the thickness of the base 5.

Figure 3:
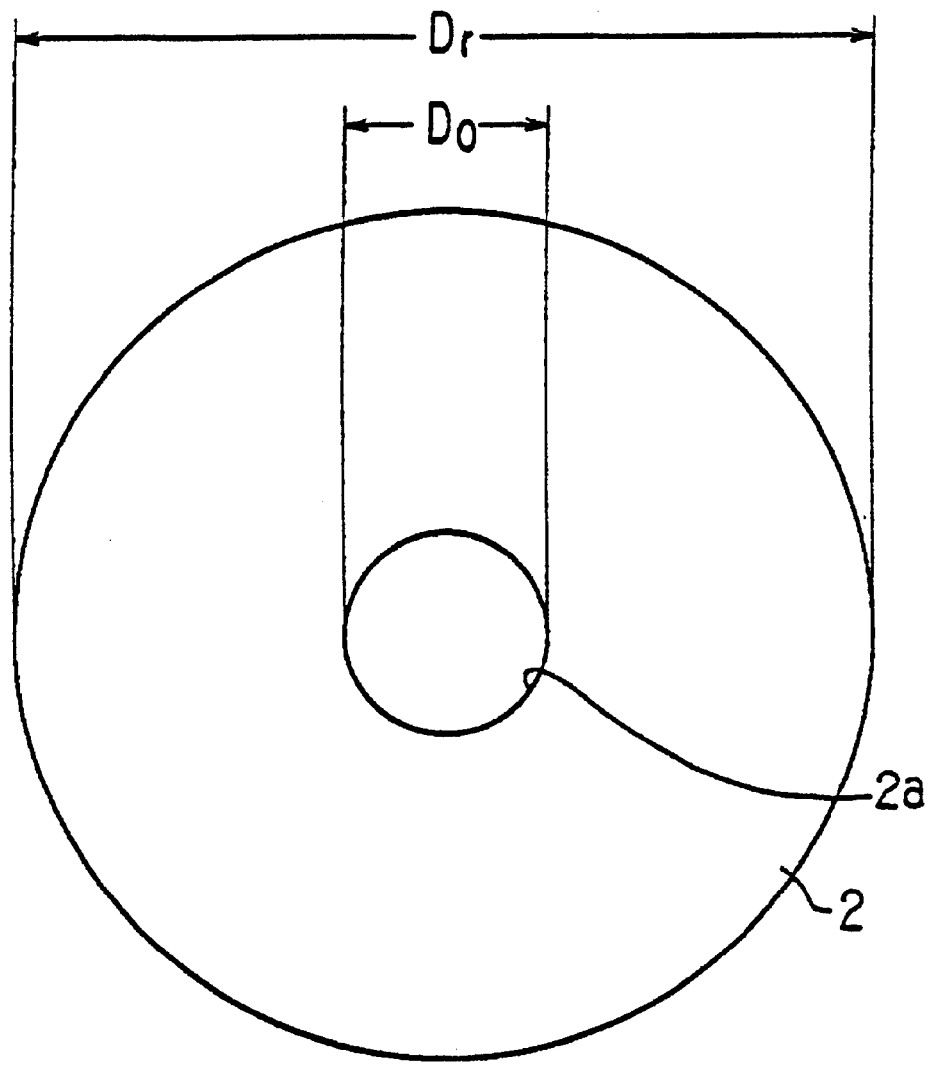
FIG. 3a is a plan view of the magnetic disk.
FIG. 3b is a longitudinal cross-sectional view of the magnetic disk.
Figure 3:

The magnetic disk 2 is provided with a central aperture 2a for mounting on the hub 9 of the motor as shown in FIG. 3. The diameter $D_0$ (see FIG. 3) of the central aperture 2a is substantially identical with the outer diameter $D_1$ of the flange 11 of said hub 9. In the illustrated embodiment, a plurality of magnetic disks 2 (two pieces of disks in the embodiment of FIG. 2) are mounted around the flange in parallel with each other. Concretely, a plurality of magnetic disks spaced apart by means of spacers 17 interposed between each disks are clamped between the shoulder 12 and a disk restraining plate 18. The plate 18 is adapted to be secured on the hub by the threads 19.

In the hard disk drive device in accordance with the present invention, although an outer diameter $D_r$ of the magnetic disks 2 is identical with that of the prior art, the inner diameter $D_0$ of the central aperture 2a of the magnetic disks 2 and the outer diameter $D_1$ of the flange 11 provided around the hub 9 of the motor 11 are larger than that of the prior art.

Further, the inner diameter of the downwardly depending flange is also enlarged. In this connection, an outer diameter and an inner diameter $D_2$ of the magnetic 13, and an outer diameter and an inner diameter $D_3$ of the stator 14, and an outer diameter and an inner diameter $D_4$ of the sleeve 6 are also enlarged. Thus, the ball bearings 7a and 7b can be enlarged in their size.

In other words, ball bearings 7a and 7b of larger size and inherently increased in their rigidity can be employed. The augmentation of the strength of the bearing moans can be achieved without the necessity of reducing the radial thickness of the magnet 13 and/or the length of radial dimension or the stator, i.e. without affecting or decreasing the magnetic flux density provided by the magnet and the stator or interfering with the performance of the motor.

In the bearing means of the above mentioned embodiment, the hub 9 and the shaft 10 are formed integrally with each other by using the same material, and the base 5 and the sleeve 6 are formed integrally with each other by using the same material, these elements can be formed separately. Although the bearing means is formed by means of a pair of upper and lower ball bearings, the double row ball bearing can be substituted therefor. Further, any other bearing such as a fluid bearing or a pneumatic bearing can also be used.

Finally, although the motor of the above-mentioned embodiment is of the outer rotor type, the motor of inner rotor type can also be substituted therefor. The effects and advantages of the present invention The hard disk drive device in accordance with the present invention having a construction as mentioned above will provide following effects. It is possible to adopt the bearing means of layer size and sufficient strength. It is therefore possible to substantially increase the impact resistance of the bearing means against damaging thereof by the concentration of stress due to the impact of the hard disk drive device. Accordingly, the lifetime of the bearing means can also be extended.

Consequently, a hard disk drive device of high impact resistance and mechanically higher reliability as well as extended lifetime can be provided.

The accuracy of rotation can be increased by the enlargement of the size of the bearing means. The possibility of decreasing of the accuracy of rotation due to the variation of the temperature is also reduced. The motor for driving the magnetic disk can be actuated accurately in high speed, and the noise and vibration due to rotation can be eliminated or reduced.

The high accuracy of rotation will assure the high packing density of the magnetic disk, so that the hard disk drive device of sufficient capacity of memory can be provided, in spite of the enlargement of the diameter of the central aperture of the magnetic disk.

Further, in the bearing means enlarged in its size, the diameter of the shaft can also be enlarged accordingly. Thus, the vibration and the noise produced by resonance can be eliminated.

While particular embodiment of the present invention have been illustrated and described, it should be obvious to those skilled in the art that various changes and modifications can be made without departing from the spirit and scope of the invention.

What is claimed is:

1. A hard disk drive comprising:
   a motor including:
      a rotor or hub having a downwardly depending flange at an outer periphery thereof, wherein said hub is journalled rotatably on a base by a bearing;
      said hub provided with a magnet positioned within an inner peripheral surface of the downwardly depending flange;
      a stator provided on the base so as to be opposed face to face with said magnet, and stator including coils;
      at least one magnetic disk having a standard outer diameter, said magnetic disk having a central aperture to be fitted around an outer peripheral surface of the flange provided around the hub of the motor, said magnetic disk adapted to be rotated by means of said motor,
      wherein said standard outer diameter is 2.5 inches (65 mm) and an inner diameter of the central aperture of a central aperture of a standard magnetic disk is 20 mm; and
      a disk restraining plate clamping said at least one magnetic disk to said hub;
      said disk restraining plate threadedly secured to said hub at a position over said magnet;
      wherein the inner diameter of said central aperture of said magnetic disk is larger than 20 mm which is the inner diameter of the central aperture of the standard magnetic disk standardized based on said standard outer diameter, and
      the outer diameter of the downwardly depending flange of said hub of the motor is enlarged to accommodate the larger inner diameter of said central aperture of said magnetic disk fitted thereon;
      said outer diameter of the downwardly depending flange of said hub being substantially identical with the larger inner diameter of said central aperture of said magnetic disk.

2. The hard disk drive according to claim 1, wherein said base includes an upstanding cylindrical sleeve portion integrally formed therewith as a single, unitary structure, said cylindrical sleeve portion positioned between said bearing and said stator.

3. The hard disk drive according to claim 2, wherein said cylindrical portion and said base are formed of a same material.

4. The hard disk drive according to claim 3, wherein said hub comprises a central shaft journalled on said base by said bearing, said hub and said central shaft being integrally formed with each other as a single, unitary structure of a same material.

5. The hard disk drive according to claim 4, wherein said bearing surrounds said central shaft of said hub.

6. The hard disk drive according to claim 1, wherein said hub comprises a central shaft journalled on said base by said bearing, said hub and said central shaft being integrally formed with each other as a single, unitary structure of a same material.

7. The hard disk drive according to claim 6, wherein said bearing surrounds said central shaft of said hub.

8. A hard disk drive comprising:
a motor including:
a rotor or hub having a downwardly depending flange at an outer periphery thereof, wherein said hub is journalled rotatably on a base by a bearing;
said hub provided with a magnet positioned within an inner peripheral surface of the downwardly depending flange;
a stator provided on the base so as to be opposed face to face with said magnet, said stator including coils;
at least one magnetic disk having a standard outer diameter, said magnetic disk having a central aperture to be fitted around an outer peripheral surface of the flange provided around the hub of the motor, said magnetic disk adapted to be rotated by means of said motor,
wherein said standard outer diameter is 3.5 inches (95 mm) and an inner diameter of the central aperture of a central aperture of a standard magnetic disk is 25 mm; and
a disk restraining plate clamping said at least one magnetic disk to said hub;
said disk restraining plate threadedly secured to said hub at a position over said magnet;
wherein the inner diameter of said central aperture of said magnetic disk is larger than 25 mm which is the inner diameter of the central aperture of the standard magnetic disk standardized based on said standard outer diameter, and
the outer diameter of the downwardly depending flange of said hub of the motor is enlarged to accommodate the larger inner diameter of said central aperture of said magnetic disk fitted thereon;
said outer diameter of the downwardly depending flange of said hub being substantially identical with the larger inner diameter of said central aperture said magnetic disk.

9. The hard disk drive according to claim 8, wherein said base includes an upstanding cylindrical sleeve portion integrally formed therewith as a single, unitary structure, said cylindrical sleeve portion positioned between said bearing and said stator.

10. The hard disk drive according to claim 9, wherein said cylindrical portion and said base are formed of a same material.

11. The hard disk drive according to claim 10, wherein said hub comprises a central shaft journalled on said base by said bearing, said hub and said central shaft being integrally formed with each other as a single, unitary structure of a same material.

12. The hard disk drive according to claim 11, wherein said bearing surrounds said central shaft of said hub.

13. The hard disk drive according to claim 8, wherein said hub comprises a central shaft journalled on said base by said bearing, said hub and said central shaft being integrally formed with each other as a single, unitary structure of a same material.

14. The hard disk drive according to claim 13, wherein said bearing surrounds said central shaft of said hub.

15. A hard disk drive for a magnetic disk of a standard outer diameter comprising:
a motor including;
a rotor having a downwardly depending flange at an outer periphery thereof, said rotor rotatably journalled on a base of said motor by a bearing;
a magnet positioned on an inner peripheral surface of the downwardly depending flange of said rotor;
stator provided on the base in face to face opposition with said magnet, said stator including coils;
at least one magnetic disk having said standard outer diameter, said at least one magnetic disk adapted to be rotated by said motor;
said at least one magnetic disk having a central aperture to be fitted around the outer peripheral surface of said downwardly depending flange depending from said rotor;
an inner diameter of said central aperture of said magnetic disk being larger than an inner diameter of central aperture of a standard commercial magnetic disk which is standardized based on said standard outer diameter,
wherein said standard outer diameter is 2.5 inches (65 mm) and an inner diameter of a central aperture of a standard commercial magnetic disk standardized based on an outer diameter of 2.5 inches is 20 mm, and
an outer diameter of said downwardly depending flange of said rotor being enlarged to accommodate the larger inner diameter of said central aperture said magnetic disk fitted thereon, said outer diameter of said downwardly depending flange being substantially identical with the larger inner diameter of said central aperture of said magnetic disk;
wherein said at least one magnetic disk has an outer diameter of 2.5 inches and said inner diameter of the central aperture of said at least one magnetic disk is larger than 20 mm,
said rotor comprises a hub portion and a central shaft portion, said flange depending downwardly from an outer periphery of said hub portion and said central shaft portion being journalled on said base by said bearing, and
an inner diameter of said downwardly depending flange of said rotor being enlarged in accordance with enlargement of said outer diameter thereof,
said enlarged outer diameter of said downwardly depending flange thereby providing an enlarged space between said central shaft portion of said rotor and said downwardly depending flange of said rotor for accommodating increased dimensions for said bearing and for said magnet positioned in said space.

16. A hard disk drive as recited in claim 15, wherein said hub portion and said central shaft portion are integrally formed with each other as a single, unitary structure of a same material.

17. A hard disk drive as recited in claim 16, wherein said base comprises an upstanding cylindrical sleeve portion positioned between said bearing and said magnet.

18. A hard disk drive as recited in claim 17, wherein said base and said cylindrical sleeve portion are integrally formed with each other as a single, unitary structure of a same material.

19. A hard disk drive as recited in claim 15, wherein said base comprises an upstanding cylindrical sleeve portion positioned between said bearing and said magnet.

20. A hard disk drive as recited in claim 19, wherein said base and said cylindrical sleeve portion are integrally formed with each other as a single, unitary structure of a same material.

21. A hard disk drive according to claim 15, wherein said magnet is directly mounted to said flange at said inner surface of said flange.

22. A hard disk drive according to claim 21, wherein said flange extends downwardly along an entire length of said magnet.

23. A hard disk drive according to claim 15, wherein said flange extends downwardly along an entire length of said magnet.

24. A hard disk drive according to claim 15, further comprising a disk restraining plate clamping said at least one magnetic disk to said rotor;
    said disk restraining plate threadedly secured to said hub by threads provided therein at a position above at least a portion of said magnet.

25. A hard disk drive according to claim 15, further comprising a disk restraining plate clamping said at least one magnetic disk to said rotor;
    said disk restraining plate having a central aperture over said central shaft portion of said rotor and over a part of said hub portion of said rotor over said bearing.

26. A hard disk drive for a magnetic disk of a standard outer diameter comprising:
    a motor including;
        a rotor having a downwardly depending flange at an outer periphery thereof, said rotor rotatably journalled on a base of said motor by a bearing;
        a magnet positioned on an inner peripheral surface of the downwardly depending flange of said rotor;
        a stator provided on the base in face to face opposition with said magnet, said stator including coils;
    at least one magnetic disk having said standard outer diameter, said at least one magnetic disk adapted to be rotated by said motor;
    said at least one magnetic disk having a central aperture to be fitted around the outer peripheral surface of said downwardly depending flange depending from said rotor;
    an inner diameter of said central aperture of said magnetic disk being larger than an inner diameter of a central aperture of a standard commercial magnetic disk which is standardized based on said standard outer diameter,
    wherein said standard outer diameter is 3.5 inches (95 mm) and an inner diameter of a central aperture of a standard commercial magnetic disk standardized based on an outer diameter of 3.5 inches is 25 mm, and
    an outer diameter of said downwardly depending flange of said rotor being enlarged to accommodate the larger inner diameter of said central aperture of said magnetic disk fitted thereon, said outer diameter of said downwardly depending flange being substantially identical with the larger inner diameter of said central aperture of said magnetic disk;
    wherein said at least one magnetic disk has an outer diameter of 3.5 inches and said inner diameter of the central aperture of said at least one magnetic disk is larger than 25 mm,
    said rotor comprises a hub portion and a central shaft portion, said flange depending downwardly from an outer periphery of said hub portion and said central shaft portion being journalled on said base by said bearing, and
    an inner diameter of said downwardly depending flange of said rotor being enlarged in accordance with enlargement of said outer diameter thereof,
    said enlarged outer diameter of said downwardly depending flange thereby providing an enlarged space between said central shaft portion of said rotor and said downwardly depending flange of said rotor for accommodating increased dimensions for said bearing and for said magnet positioned in said space.

27. A hard disk drive as recited in claim 26, wherein said hub portion and said central shaft portion are integrally formed with each other as a single, unitary structure of a same material.

28. A hard disk drive as recited in claim 27, wherein said base comprises an upstanding cylindrical sleeve portion positioned between said bearing and said magnet.

29. A hard disk drive as recited in claim 28, wherein said base and said cylindrical sleeve portion are integrally formed with each other as a single, unitary structure of a same material.

30. A hard disk drive as recited in claim 26, wherein said base comprises an upstanding cylindrical sleeve portion positioned between said bearing and said magnet.

31. A hard disk drive as recited in claim 30, wherein said base and said cylindrical sleeve portion are integrally formed with each other as a single, unitary structure of a same material.

32. A hard disk drive according to claim 26, wherein said magnet is directly mounted to said flange at said inner surface of said flange.

33. A hard disk drive according to claim 32, wherein said flange extends downwardly along an entire length of said magnet.

34. A hard disk drive according to claim 26, wherein said flange extends downward along an entire length of said magnet.

35. A hard disk drive according to claim 26, further comprising a disk restraining plate clamping said at least one magnetic disk to said rotor;
    said disk restraining plate threadedly secured to said hub by threads provided therein at a position above at least a portion of said magnet.

36. A hard disk drive according to claim 26, further comprising a disk restraining plate clamping said at least one magnetic disk to said rotor;
    said disk restraining plate having a central aperture over said central shaft portion of said rotor and over a part of said hub portion of said rotor over said bearing.

* * * * *